United States Patent
Mizokawa et al.

(10) Patent No.: US 10,640,009 B2
(45) Date of Patent: May 5, 2020

(54) SEAT OCCUPANCY SENSOR HAVING AN ARRAY OF SENSORS SHIFTED FROM A CENTER OF A SEAT OF A VEHICLE

(71) Applicants: AISIN SEIKI KABUSHIKI KAISHA, Kariya-shi (JP); TOYOTA JIDOSHA KABUSHIKI KAISHA, Toyota-shi (JP)

(72) Inventors: Yoshihiro Mizokawa, Chiryu (JP); Keiichi Yanai, Anjo (JP); Atsushi Kobayashi, Nagoya (JP); Keiichi Kondo, Chiryu (JP); Shunsuke Nagai, Toyota (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 40 days.

(21) Appl. No.: 15/915,175

(22) Filed: Mar. 8, 2018

(65) Prior Publication Data
US 2018/0257513 A1    Sep. 13, 2018

(30) Foreign Application Priority Data

Mar. 8, 2017    (JP) ................................ 2017-043816

(51) Int. Cl.
*B60N 2/00*    (2006.01)
*B60R 21/015*    (2006.01)
(Continued)

(52) U.S. Cl.
CPC ........ *B60N 2/002* (2013.01); *B60R 21/01524* (2014.10); *H01H 13/702* (2013.01);
(Continued)

(58) Field of Classification Search
CPC ............. B60N 2/002; B60R 21/01512; B60R 21/0152; B60R 21/01526; B60R 21/01554; B60R 21/01556; B60R 21/01524

See application file for complete search history.

(56) References Cited

U.S. PATENT DOCUMENTS 5,474,327 A * 12/1995 Schousek .......... B60R 21/01516
                                                    180/268
5,844,486 A * 12/1998 Kithil .................... B60N 2/002
                                                    340/573.4
(Continued)

FOREIGN PATENT DOCUMENTS

DE    10 2010 016 834 A1    12/2010
EP    2 329 998 A1    6/2011
(Continued)

OTHER PUBLICATIONS

European Office Action dated May 3, 2019 in Patent Application No. 18 160 658.3, 5 pages.

*Primary Examiner* — Lisa M Caputo
*Assistant Examiner* — Tran M. Tran
(74) *Attorney, Agent, or Firm* — Oblon, McClelland, Maier & Neustadt, L.L.P.

(57) ABSTRACT

A seat occupancy sensor includes: a first sensor group having a plurality of first sensor cells that are arrayed in a front-rear direction of a seat and become conductive as a load is applied thereto; a second sensor group having a plurality of second sensor cells that are arrayed in the front-rear direction, farther on a front side of the seat and closer to an end of the seat in a width direction than the first sensor group, and that become conductive as a load is applied thereto; and an electronic control unit. The electronic control unit determines that someone is sitting on the
(Continued)

seat when both of at least one of the first sensor cells and at least one of the second sensor cells become conductive.

13 Claims, 4 Drawing Sheets

(51) Int. Cl.
*H01H 13/702* (2006.01)
*H01H 13/803* (2006.01)
*H01H 13/807* (2006.01)
*B60Q 9/00* (2006.01)

(52) U.S. Cl.
CPC ........ *H01H 13/803* (2013.01); *H01H 13/807* (2013.01); *B60Q 9/00* (2013.01); *H01H 2203/054* (2013.01); *H01H 2225/008* (2013.01); *H01H 2227/032* (2013.01)

(56) References Cited

U.S. PATENT DOCUMENTS

| | | | | |
|---|---|---|---|---|
| 5,896,090 | A * | 4/1999 | Okada | B60N 2/002 200/85 A |
| 6,242,820 | B1 * | 6/2001 | Shankar | G01G 19/4142 180/273 |
| 6,345,839 | B1 * | 2/2002 | Kuboki | B60N 2/002 280/735 |
| 6,371,552 | B1 * | 4/2002 | Narita | B60N 2/002 297/180.1 |
| 6,392,178 | B1 * | 5/2002 | Kuratani | H01H 3/141 200/512 |
| 6,497,430 | B1 * | 12/2002 | Odom | B60R 21/01516 180/273 |
| 6,546,822 | B1 * | 4/2003 | Tahara | B60N 2/002 73/862.41 |
| 6,629,445 | B2 * | 10/2003 | Yamanaka | G01G 19/4142 73/1.13 |
| 6,750,412 | B2 * | 6/2004 | Ito | H01H 3/141 200/85 A |
| 6,794,590 | B2 * | 9/2004 | Federspiel | H01H 3/141 200/302.1 |
| 6,876,912 | B2 * | 4/2005 | Winkler | G06K 9/00362 280/734 |
| 7,043,997 | B2 * | 5/2006 | Mattson | B60R 21/01538 177/210 R |
| 7,162,344 | B2 * | 1/2007 | Kojima | B60N 2/002 180/273 |
| 7,212,894 | B2 * | 5/2007 | Hattori | B60N 2/002 180/273 |
| 7,216,895 | B2 * | 5/2007 | Hattori | B60N 2/002 180/273 |
| 7,391,310 | B2 * | 6/2008 | Ito | B60R 21/01546 280/801.1 |
| 7,401,532 | B2 * | 7/2008 | Wanami | B60R 21/01532 73/862.626 |
| 7,469,594 | B2 * | 12/2008 | Jitsui | B60R 21/01532 73/779 |
| 7,528,333 | B2 * | 5/2009 | Kawahira | B60N 2/002 200/512 |
| 7,548,808 | B2 * | 6/2009 | Winkler | G06K 9/00362 180/273 |
| 7,629,546 | B2 * | 12/2009 | Saitoh | B60N 2/002 200/85 A |
| 7,859,422 | B2 * | 12/2010 | Itoh | B60N 2/002 340/667 |
| 7,900,523 | B2 * | 3/2011 | Kogure | A61B 5/1036 73/862.041 |
| 7,918,144 | B2 * | 4/2011 | Saitoh | B60N 2/002 73/862.046 |
| 8,013,264 | B2 * | 9/2011 | Kawahira | B60N 2/002 200/512 |
| 8,041,482 | B2 * | 10/2011 | Federspiel | B60R 21/01526 280/735 |
| 8,115,648 | B2 | 2/2012 | Lorenz et al. | |
| 8,346,440 | B2 * | 1/2013 | Nakagawa | B60R 21/01532 280/735 |
| 8,487,638 | B2 * | 7/2013 | Osaki | H01R 13/6683 324/658 |
| 8,665,103 | B2 * | 3/2014 | Hayakawa | B60R 21/01532 340/500 |
| 9,018,546 | B2 * | 4/2015 | Kawahira | B60N 2/002 177/136 |
| 9,110,112 | B2 * | 8/2015 | Nakagawa | G01R 27/2605 |
| 2008/0046152 | A1 * | 2/2008 | Ohtake | B60N 2/002 701/49 |
| 2008/0122645 | A1 * | 5/2008 | Saitoh | B60N 2/002 340/667 |
| 2009/0003008 | A1 * | 1/2009 | Ohtake | B60Q 1/10 362/467 |
| 2017/0106768 | A1 * | 4/2017 | Curtis | B60N 2/002 |

FOREIGN PATENT DOCUMENTS

| | | |
|---|---|---|
| JP | 2008-3095 A | 1/2008 |
| JP | 2009-236837 | 10/2009 |
| JP | 2009-248674 | 10/2009 |
| JP | 4629124 | 2/2011 |
| JP | 2011-116262 A | 6/2011 |
| JP | 2014-58291 A | 4/2014 |
| JP | 6011190 | 10/2016 |

* cited by examiner

SEAT OCCUPANCY SENSOR HAVING AN ARRAY OF SENSORS SHIFTED FROM A CENTER OF A SEAT OF A VEHICLE

INCORPORATION BY REFERENCE

The disclosure of Japanese Patent Application No. 2017-043816 filed on Mar. 8, 2017 including the specification, drawings and abstract is incorporated herein by reference in its entirety.

BACKGROUND

1. Technical Field

The present disclosure relates to a seat occupancy sensor.

2. Description of Related Art

Examples of hitherto known seat occupancy sensors include the one described in Japanese Patent No. 4629124. This seat occupancy sensor is formed by a so-called membrane switch, and is disposed in a seat surface of a vehicle seat to determine (detect) whether someone is sitting on the seat.

SUMMARY

Japanese Patent No. 4629124 states that a plurality of detection units (sensor cells) of the seat occupancy sensor are disposed according to a load pressure region that reflects the shapes of the buttocks and the femoral region of a seated person. However, these detection units are collectively disposed closer to the rear side of a seat, and thus are substantially subjected to the load of the buttocks of a seated person. Therefore, for example, when baggage is placed at a position corresponding to the buttocks of a seated person, the detection units subjected to the load of this baggage may become conductive, leading the seat occupancy sensor to erroneously determine that someone is sitting on the seat.

The present disclosure provides a seat occupancy sensor that can determine, with higher accuracy, whether someone is sitting on a vehicle seat.

A seat occupancy sensor according to an aspect of the present disclosure includes: a first sensor group having first detection units as a plurality of detection units that are arrayed in a front-rear direction of a seat of a vehicle and that become conductive as a load is applied thereto; a second sensor group having second detection units as a plurality of detection units that are arrayed in the front-rear direction, farther on the front side of the seat and closer to an end of the seat in a width direction than the first sensor group, and that become conductive as a load is applied thereto; and an electronic control unit configured to determine that someone is sitting on the seat when both of at least one of the first detection units and at least one of the second detection units become conductive.

According to this configuration, one of the first detection units of the first sensor group that is located farther on the rear side of the seat and farther away from the end of the seat in the width direction than the second sensor group, is highly likely to become conductive as a load is applied thereto from the buttocks of a seated person. On the other hand, one of the second detection units of the second sensor group that is located farther on the front side of the seat and closer to the end of the seat in the width direction than the first sensor group, is highly likely to become conductive as a load is applied thereto from the femoral region of a seated person. Therefore, when both of at least one of the first detection units and at least one of the second detection units become conductive, it is highly likely that the load is applied from the buttocks and the femoral region of the seated person at the same time, i.e., someone is sitting on the seat. This electronic control unit determines that someone is sitting on the seat when both of at least one of the first detection units and at least one of the second detection units become conductive, and thus can determine, with higher accuracy, whether someone is sitting on the seat.

In the above seat occupancy sensor, the detection sensitivity of the first detection units may be lower than the detection sensitivity of the second detection units. Since the load applied from the buttocks of a seated person is usually larger than the load applied from the femoral region of the seated person, the first detection units are highly likely to become conductive even when the detection sensitivity thereof is lower than the detection sensitivity of the second detection units. According to this configuration, the detection sensitivity of the first detection units is lower than the detection sensitivity of the second detection units, so that it is less likely that one of the first detection units becomes conductive, for example, due to baggage placed on the seat. Therefore, the likelihood of the seat occupancy sensor erroneously determining that someone is sitting on the seat can be reduced.

In the above seat occupancy sensor, the first detection units may have an electrode area smaller than the electrode area of the second detection units so as to have the detection sensitivity lower than the detection sensitivity of the second detection units.

According to this configuration, it is possible to set the detection sensitivity of the first detection units to be lower than the detection sensitivity of the second detection units by using a very simple structure based on the size relationship between the electrode areas. The above electronic control unit may be configured to determine that someone is sitting on the seat when both of one of the plurality of first detection units and one of the plurality of second detection units that is separated from that one first detection unit by a predetermined distance become conductive.

According to this configuration, when the first detection unit and the second detection unit that become conductive are separated from each other by the predetermined distance, it is more highly likely that the load is applied from the buttocks and the femoral region of the seated person at the same time, i.e., someone is sitting on the seat. Thus, this electronic control unit can determine, with even higher accuracy, whether someone is sitting on the seat.

The above electronic control unit may be configured to determine that someone is sitting on the seat when both of one of the first detection units and one of the second detection units that is located farther toward the front side of the seat from that one first detection unit with two of the detection units therebetween, become conductive.

In the above seat occupancy sensor, the seat may be a center seat section that is disposed at the center of a plurality of seat sections provided side by side in a width direction of the vehicle in a rear seat that is disposed on the rear side of the vehicle. According to this configuration, the first sensor group and the second sensor group are disposed in the center seat section. The center seat section is often subjected to a load, for example, as a person sitting on the adjacent seat section rests his or her hand on the center seat section. However, the characteristics of such a load are naturally different from those of a load that is applied from the buttocks and the femoral region of a seated person at the same time. Thus, the likelihood of the seat occupancy sensor erroneously determining that someone is sitting on the seat can be reduced.

The above aspect offers an advantage that whether someone is sitting on a vehicle seat can be determined with higher accuracy.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
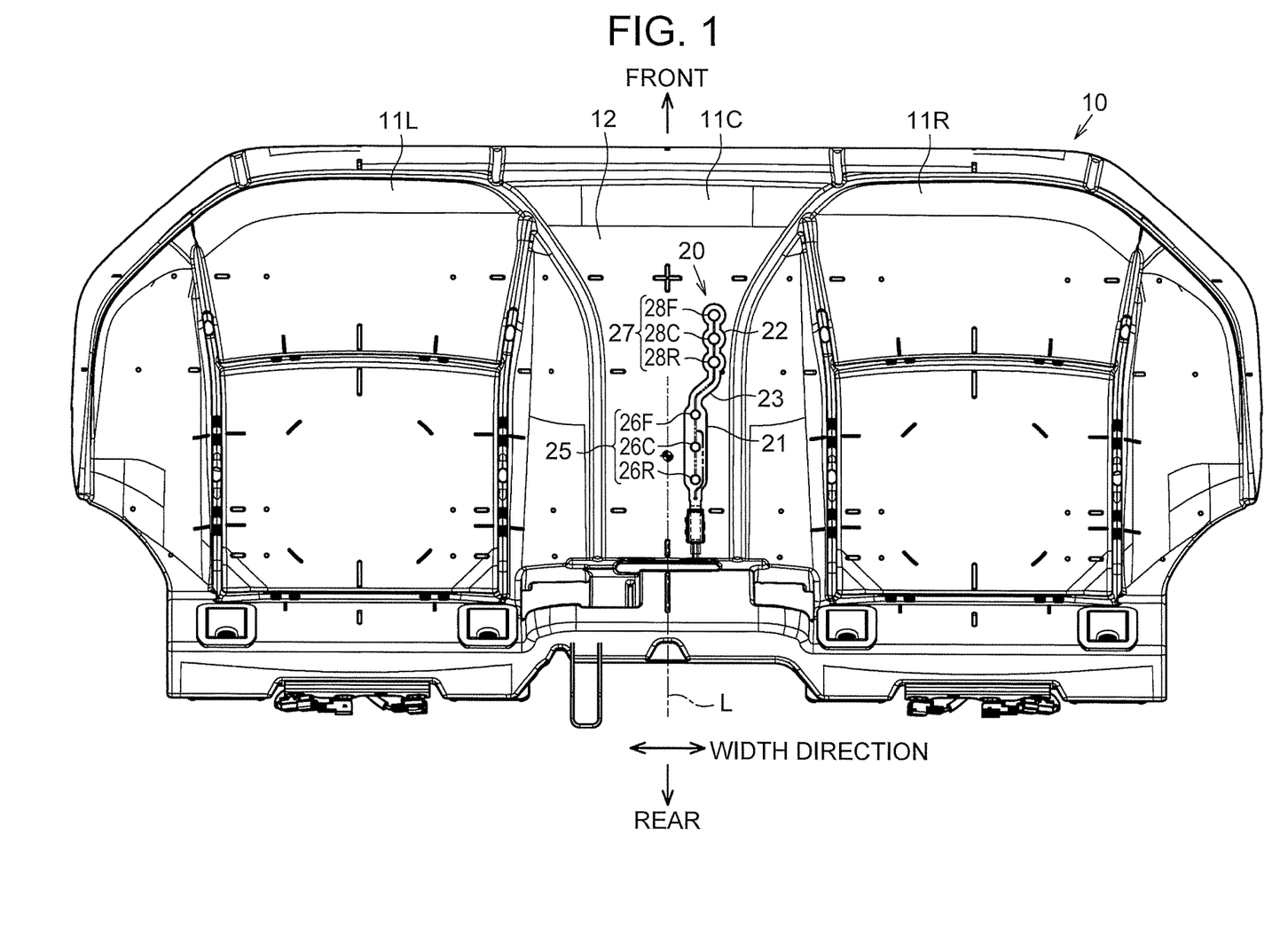
FIG. 1 is a plan view showing the structure of a rear seat to which an embodiment of a seat occupancy sensor is applied.

An embodiment of a seat occupancy sensor will be described below. In this embodiment, a front-rear direction of a vehicle coincides with a front-rear direction of a seat, and both directions will be hereinafter referred to as the "front-rear direction." As shown in FIG. 1, a rear seat 10 installed on a rear seat side of a sedan, for example, is provided with three seat sections 11R, 11C, 11L side by side in a vehicle width direction. The seat section 11C that is a center seat section and disposed at the center of the plurality of seat sections 11R, 11C, 11L has a dimension in the vehicle width direction that is set to be smaller than (e.g., to about half) the dimension of each of the seat sections 11R, 11L in the vehicle width direction. A seat occupancy sensor 20 is installed in a seat surface 12 of the seat section 11C.

The seat occupancy sensor 20 integrally has: a first detection strip 21 that extends in the front-rear direction on a rear side of the seat surface 12; a second detection strip 22 that extends in the front-rear direction, farther on the front side (the front side of the seat section 11C) than the first detection strip 21; and a connection portion 23 of which both ends are respectively connected to a front end of the first detection strip 21 and a rear end of the second detection strip 22. The first detection strip 21 is disposed somewhat closer to an end (on the right side in FIG. 1) in the vehicle width direction relative to a centerline L of the seat surface 12 extending in the front-rear direction, while the second detection strip 22 is disposed even more closer to the end (on the right side in FIG. 1) in the vehicle width direction than the first detection strip 21. The connection portion 23 is inclined so as to be directed toward the end in the vehicle width direction while extending toward the front side according to the positions of the first and second detection strips 21, 22.

The seat occupancy sensor 20 is formed by a membrane switch, in which a pair of electrode sheets (contact sheets) that are insulating films (e.g., polyester films) with an electrically conductive ink (e.g., a silver paste or a carbon paste) printed thereon are laminated with an insulating spacer (e.g., a polyester film) therebetween.

Figure 2:
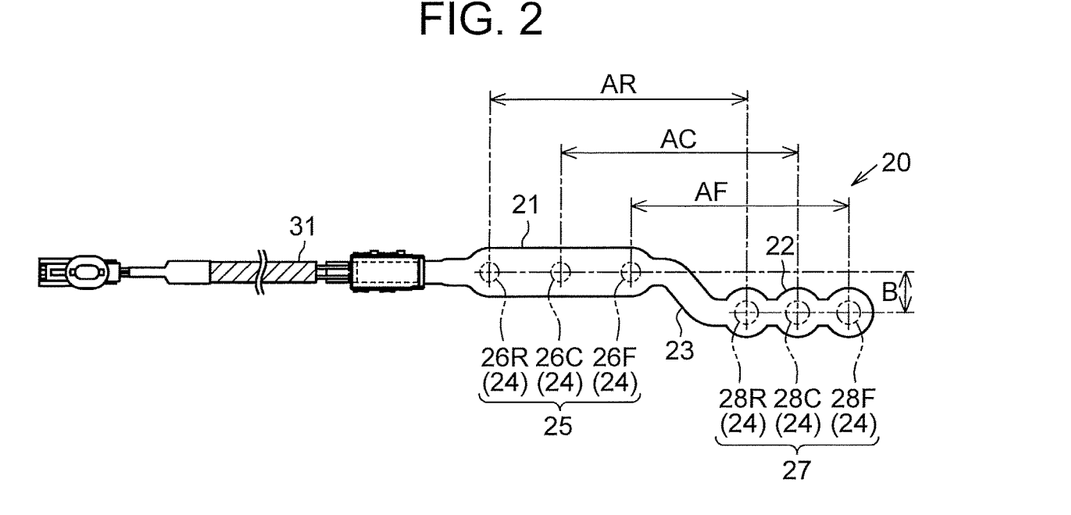
FIG. 2 is a plan view showing the structure of the seat occupancy sensor of the embodiment.

As shown in FIG. 2, the first detection strip 21 is provided with a first sensor group 25 that has a plurality of (three) substantially circular first sensor cells 26F, 26C, 26R as detection units 24 or first detection units arrayed in a longitudinal direction of the first detection strip 21 (front-rear direction). The first sensor cells 26F, 26C, 26R are each composed of a pair of electrodes that are respectively printed on a pair of electrode sheets and face each other, and become conductive as a first predetermined load F1 is applied thereto. Similarly, the second detection strip 22 is provided with a second sensor group 27 that has a plurality of (three) substantially circular second sensor cells 28F, 28C, 28R as detection units 24 or second detection units arrayed in a longitudinal direction of the second detection strip 22 (front-rear direction). In the front-rear direction, the first and second sensor cells 26F, 28F, the first and second sensor cells 26C, 28C, and the first and second sensor cells 26R, 28R are separated from each other by predetermined distances AF, AC, AR, respectively, that are equal to or longer than a fixed distance A (e.g., 100 mm). The fixed distance A is set based on a distance at which, when a person sitting on the seat section 11R or 11L puts his or her hand on the seat surface 12 of the adjacent seat section 11C, a load that is equal to or larger than both the first and second predetermined loads F1, F2 cannot be applied from that hand. The first and second sensor groups 25, 27 are separated from each other by a predetermined distance B (e.g., 20 to 50 mm) in the width direction. The predetermined distance B is set, for example, based on a distance by which the buttocks and the femoral region of a person sitting on the seat section 11C are separated from each other in the width direction. It should be understood that the second sensor group 27 is located farther on the front side and closer to the end in the width direction than the first sensor group 25.

The second sensor cells 28F, 28C, 28R are each composed of a pair of electrodes that are respectively printed on a pair of electrode sheets and face each other, and become conductive as the second predetermined load F2 smaller than the first predetermined load F1 is applied thereto. This means that the detection sensitivity of the first sensor cells 26F, 26C, 26R is set to be lower than the detection sensitivity of the second sensor cells 28F, 28C, 28R. Specifically, the first sensor cells 26F, 26C, 26R have a diameter set to be smaller than the diameter of the second sensor cells 28F, 28C, 28R so as to have the detection sensitivity set to be lower than the detection sensitivity of the second sensor cells 28F, 28C, 28R. In other words, the first sensor cells 26F, 26C, 26R have an electrode area set to be smaller than the electrode area of the second sensor cells 28F, 28C, 28R so as to have the detection sensitivity set to be lower than the detection sensitivity of the second sensor cells 28F, 28C, 28R. A cable 31 for external connection is provided at a rear end of the seat occupancy sensor 20 (first detection strip 21).

Figure 3:
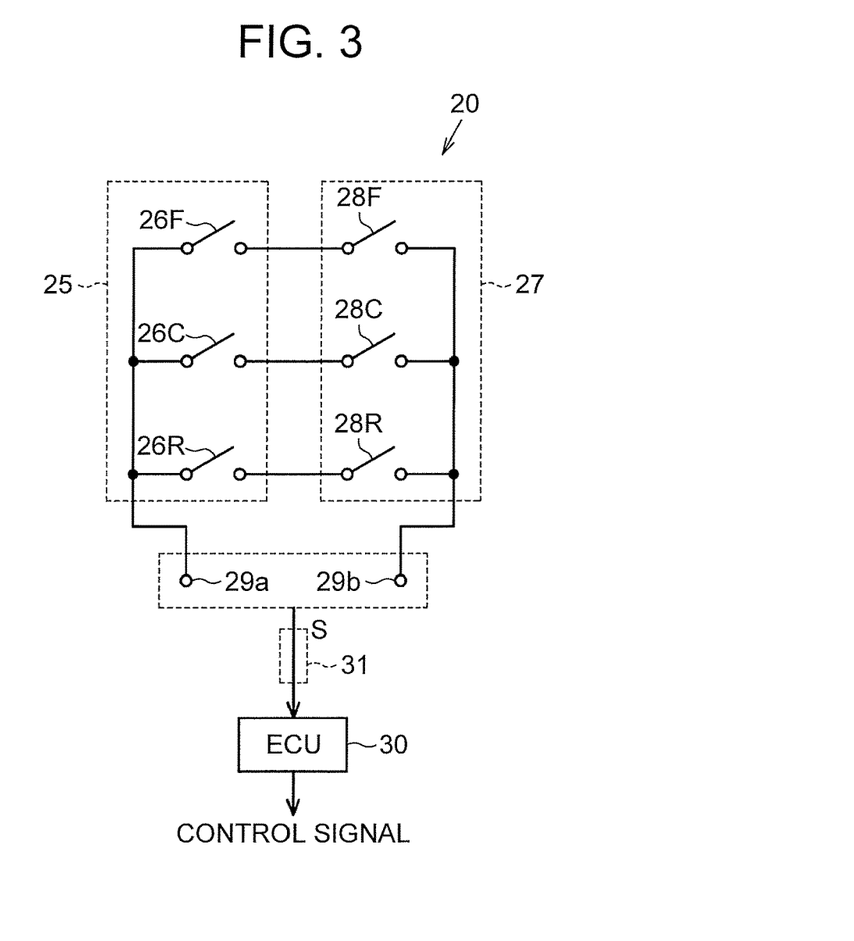
FIG. 3 is an equivalent circuit diagram showing the structure of the seat occupancy sensor of the embodiment.

As shown in the equivalent circuit diagram of FIG. 3, in the seat occupancy sensor 20, the series-connected first and second sensor cells 26F, 28F, the series-connected first and second sensor cells 26C, 28C, and the series-connected first and second sensor cells 26R, 28R are connected in parallel to one another. Thus, the seat occupancy sensor 20 becomes conductive when both of one of the plurality of first sensor cells 26F, 26C, 26R and one of the second sensor cells 28F, 28C, 28R that is connected in series to that one conductive first sensor cell become conductive. The second sensor cell 28F is located farther toward the front side than the first sensor cell 26F, with two detection units 24 therebetween.

The first and second sensor cells 26C, 28C and the first and second sensor cells 26R, 28R are disposed in the same manner.

The cable 31 is electrically connected to both terminals 29a, 29b of an electric circuit (switch circuit) composed of the first and second sensor groups 25, 27. The seat occupancy sensor 20 is provided with an electronic control unit (ECU) 30 that is electrically connected to both terminals 29a, 29b through the cable 31. The seat occupancy sensor 20 outputs a detection signal S according to a conductive state or a non-conductive state of the seat occupancy sensor 20 to the ECU 30 through the cable 31. The ECU 30 determines whether someone is sitting on the seat section 11C based on the detection signal S output from the seat occupancy sensor 20. Specifically, when the seat occupancy sensor 20 becomes conductive, the ECU 30 determines that someone is sitting on the seat section 11C. Then, the ECU 30 outputs a control signal according to this determination result to an appropriate device. Specifically, for example, when the ECU 30 determines that someone is on the seat section 11C, the ECU 30 outputs a control signal for activating a notification member (warning lamp etc.) that prompts the person to wear a seatbelt.

Figure 4:
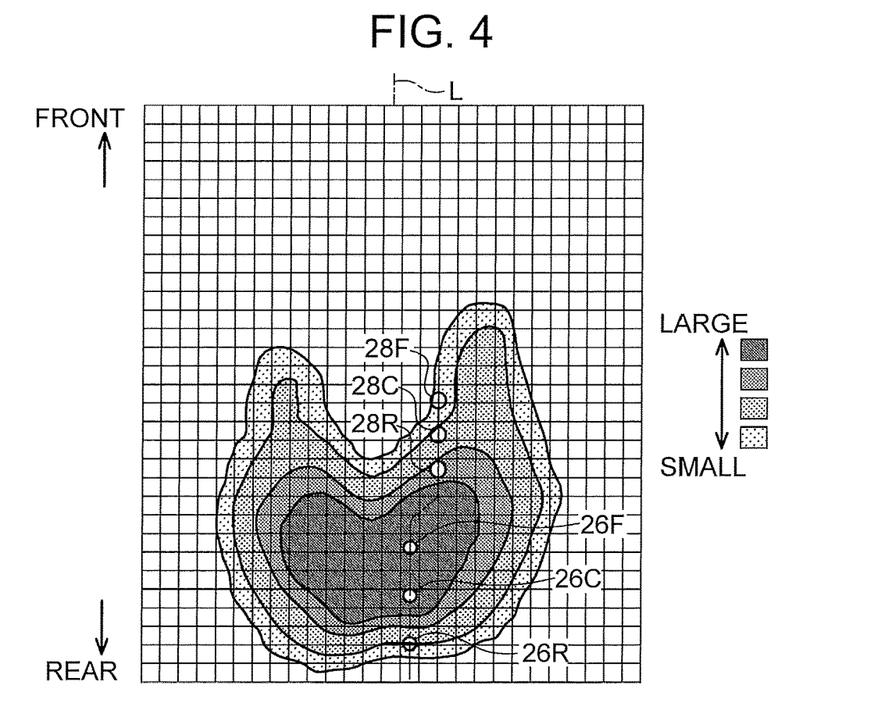
FIG. 4 is an illustration of a load pressure distribution map formed by a person sitting on a seat.

FIG. 4 is an illustration of a load pressure distribution map formed by a person sitting on the seat surface 12 of the seat section 11C. This load pressure distribution map shows a load pressure value measured at each of small seat surface regions into which the seat surface 12 is divided in a lattice pattern. Regions with larger load pressure values are indicated by darker shading. As shown in FIG. 4, each load pressure region with equivalent load pressure values assumes a substantially concave shape that is (bilaterally) symmetrical with respect to the centerline L. The load pressure value is larger as the load pressure region is located farther on the inside, and it is conversely smaller as the load pressure region is located farther on the outside. Medium load pressure regions with relatively small load pressure values each extend frontward to a larger extent at both sides in the width direction. This is because the load pressure on the inside is higher according to the position of the buttocks of the seated person. Moreover, this is because the load pressure on the outside is lower and the distribution of the load pressure extends toward the front side according to the position of the femoral region of the seated person.

It can be seen that at least one of the plurality of first sensor cells 26F, 26C, 26R is disposed in the inner load pressure regions with larger load pressure values. Thus, at least one of the first sensor cells 26F, 26C, 26R is highly likely to become conductive as a relatively high load pressure (load) is applied thereto. On the other hand, it can be seen that at least one of the second sensor cells 28F, 28C, 28R is disposed in the outer load pressure regions with smaller load pressure values. Thus, a relatively low load pressure (load) is applied to at least one of the plurality of second sensor cells 28F, 28C, 28R. However, as the detection sensitivity of the second sensor cells 28F, 28C, 28R is set to be relatively high, this one second sensor cell is highly likely to become conductive.

Figure 6:
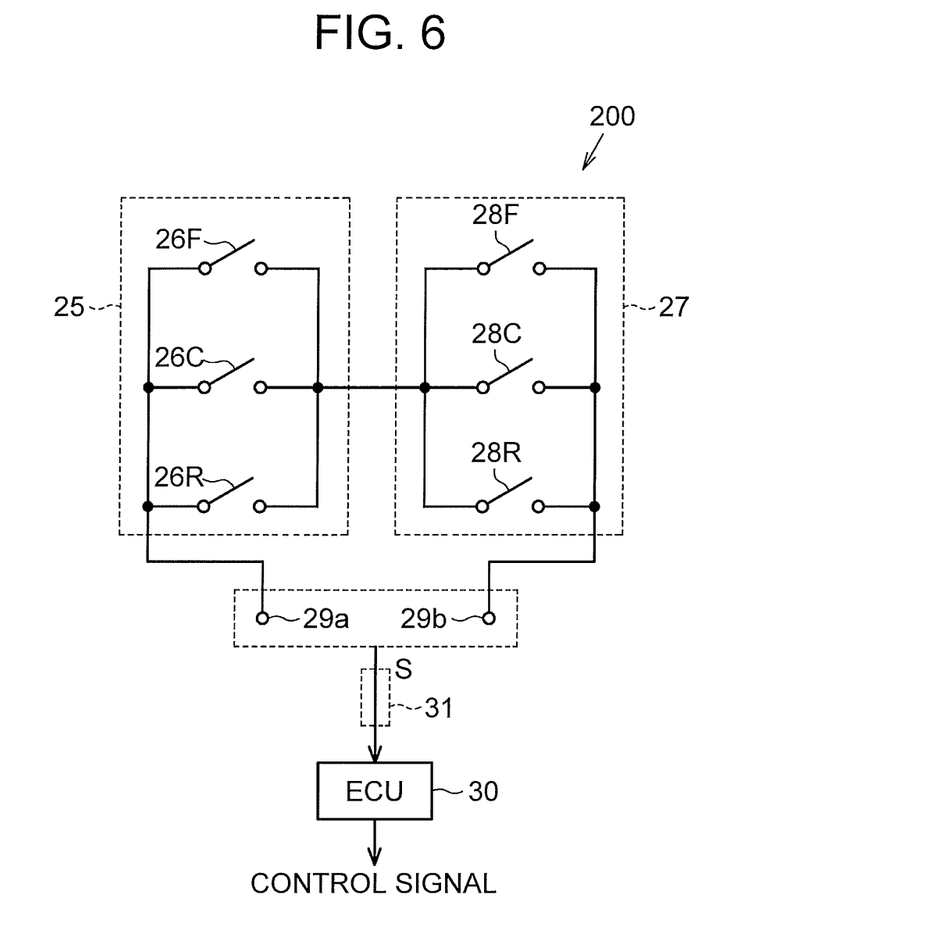
FIG. 6 is an equivalent circuit diagram showing the structure of a seat occupancy sensor of another embodiment.

In other words, when both of at least one of the plurality of first sensor cells 26F, 26C, 26R and at least one of the plurality of second sensor cells 28F, 28C, 28R become conductive, it is highly likely that the load is applied from the buttocks and the femoral region of the seated person at the same time, i.e., someone is sitting on the seat section 11C. In this case, a seat occupancy sensor 200 may have an equivalent circuit as shown in FIG. 6.

Figure 5:
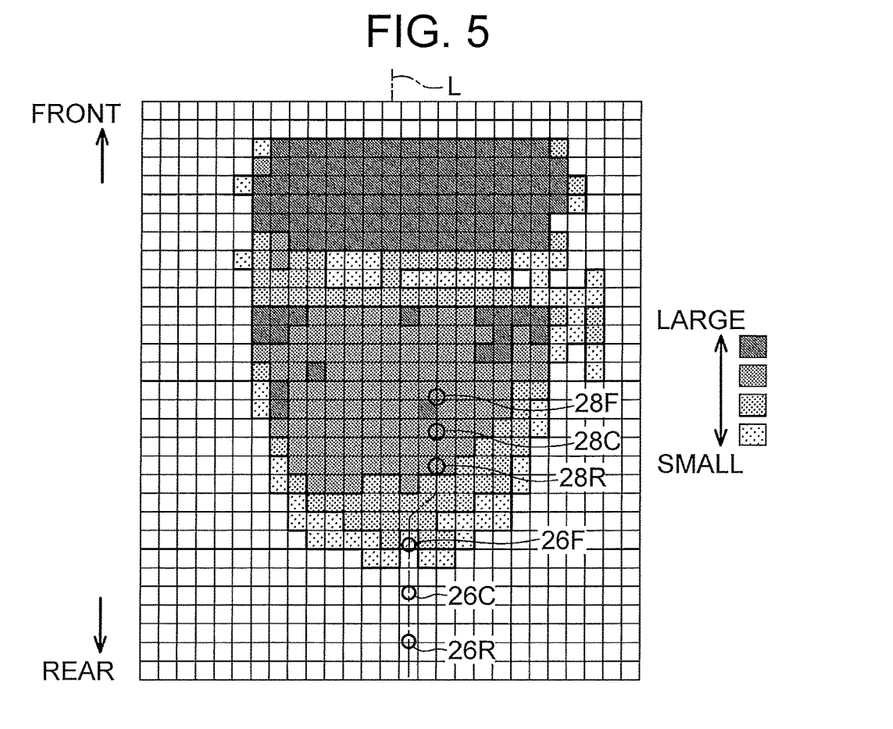
FIG. 5 is an illustration of a load pressure distribution map formed by baggage on a seat.

FIG. 5 is an illustration of a load pressure distribution map formed by baggage placed on the seat surface 12 of the seat section 11C, more particularly, by a seatback (not shown) that is reclined so as to be folded over the seat surface 12 and baggage placed on this seatback. As shown in FIG. 5, each load pressure region with equivalent load pressure values is substantially (bilaterally) symmetrical with respect to the centerline L. However, basically the load pressure value is larger as the load pressure region is located farther on the front side, and it is conversely smaller as the load pressure region is located farther on the rear side. This is because a load is more likely to be exerted on the front side of the seat surface 12 when the seatback is reclined.

It can be seen that at least one of the plurality of second sensor cells 28F, 28C, 28R is disposed in the front load pressure regions with larger load pressure values. Thus, at least one of the second sensor cells 28F, 28C, 28R is highly likely to become conductive, also because the detection sensitivity thereof is set to be relatively high. On the other hand, it can be seen that at least one of the first sensor cells 26F, 26C, 26R is disposed in the rear load pressure regions with smaller load pressure values. However, as the detection sensitivity of the plurality of first sensor cells 26F, 26C, 26R is set to be relatively low, this one first sensor cell is hardly likely to become conductive.

Thus, baggage placed on the seat surface 12 of the seat section 11C causes none of the plurality of first sensor cells 26F, 26C, 26R to become conductive; therefore, it is hardly likely that the seat occupancy sensor 20 erroneously determines that someone is sitting on the seat section 11C.

Next, effects of this embodiment will be described along with advantages thereof. (1) In this embodiment, one of the first sensor cells 26F, 26C, 26R of the first sensor group 25 that is located farther on the rear side of the seat section 11C and farther away from the end of the seat section 11C (closer to the centerline L) in the width direction than the second sensor group 27, is highly likely to become conductive as a load is applied thereto from the buttocks of a seated person. On the other hand, one of the second sensor cells 28F, 28C, 28R of the second sensor group 27 that is located farther on the front side of the seat section 11C and closer to the end of the seat section 11C in the width direction than the first sensor group 25, is highly likely to become conductive as a load is applied thereto from the femoral region of a seated person. Therefore, when both of at least one of the plurality of first sensor cells 26F, 26C, 26R and at least one of the plurality of second sensor cells 28F, 28C, 28R become conductive, it is highly likely that the load is applied from the buttocks and the femoral region of the seated person at the same time, i.e., someone is sitting on the seat section 11C. The seat occupancy sensor 20 determines that someone is sitting on the seat section 11C when both of at least one of the plurality of first sensor cells 26F, 26C, 26R and at least one of the plurality of second sensor cells 28F, 28C, 28R become conductive, and thus can determine, with higher accuracy, whether someone is sitting on the seat.

It is possible to reduce the likelihood of the seat occupancy sensor 20 erroneously determining that someone is sitting on the seat section 11C, for example, due to baggage placed on the seat section 11C. (2) Since the load applied from the buttocks of a seated person is usually larger than the load applied from the femoral region of the seated person, the first sensor cells 26F, 26C, 26R are highly likely to become conductive even when the detection sensitivity thereof is lower than the detection sensitivity of the second sensor cells 28F, 28C, 28R. In this embodiment, the detection sensitivity of the first sensor cells 26F, 26C, 26R is set to be lower than the detection sensitivity of the second sensor cells 28F, 28C, 28R, which makes it less likely that one of the first sensor cells 26F, 26C, 26R may become conductive, for example, due to baggage placed at a position corresponding to the buttocks of a seated person. Thus, the likelihood of the seat occupancy sensor 20 erroneously determining that someone is sitting on the seat section 11C can be further reduced.

While the load applied from the femoral region of a seated person is generally smaller than the load applied from the buttocks of the seated person, setting the detection sensitivity of the second sensor cells 28F, 28C, 28R to be relatively high allows the seat occupancy sensor 20 to more reliably detect that someone is sitting on the seat section 11C.

(3) In this embodiment, the seat occupancy sensor 20 determines that someone is sitting on the seat section 11C when both of one of the plurality of first sensor cells 26F, 26C, 26R and one of the plurality of second sensor cells 28F, 28C, 28R that is separated from that one of the first sensor cells 26F, 26C, 26R by the predetermined distance AF, AC, or AR become conductive. In other words, the seat occupancy sensor 20 determines that someone is sitting on the seat section 11C when both of one of the plurality of first sensor cells 26F, 26C, 26R and one of the plurality of second sensor cells 28F, 28C, 28R that is located farther toward the front of that one conductive first sensor cell with two detection units 24 therebetween become conductive. When one of the first sensor cells 26F, 26C, 26R and one of the second sensor cells 28F, 28C, 28R that become conductive are separated from each other by the predetermined distance AF, AC, or AR, it is more highly likely that the load is applied from the buttocks and the femoral region of the seated person at the same time, i.e., someone is sitting on the seat section 11C. Thus, the seat occupancy sensor 20 can determine, with even higher accuracy, whether someone is sitting on the seat.

For example, even when a person sitting on the seat section 11R or 11L rests his or her hand on the adjacent seat section 11C and thereby applies a load, it is little likely that this load is applied at two points separated from each other by the predetermined distance AF, AC, or AR. Accordingly, it is little likely that the seat occupancy sensor 20 erroneously determines that someone is sitting on the seat section 11C due to this load.

(4) In this embodiment, the first and second sensor groups 25, 27 are disposed in the seat section 11C that is disposed at the center of the plurality of seat sections 11R, 11C, 11L provided side by side in the vehicle width direction in the rear seat 10 that is disposed on the rear side of the vehicle. The seat section 11C is often subjected to a load, for example, as a person sitting on the adjacent seat section 11R or 11L rests his or her hand on the seat section 11C. However, the characteristics of such a load are naturally different from those of a load that is applied from the buttocks and the femoral region of a seated person at the same time. Thus, the likelihood of the seat occupancy sensor 20 erroneously determining that someone is sitting on the seat section 11C due to such a load can be reduced.

(5) In this embodiment, the seat occupancy sensor 20 is basically disposed in such a direction that the seat occupancy sensor 20 is long in the front-rear direction. Thus, the seat occupancy sensor 20 can be more suitably installed in the seat section 11C that is long in the front-rear direction (vertically long).

(6) In this embodiment, the actual distances by which the first sensor cells 26F, 26C, 26R and the second sensor cells 28F, 28C, 28R are respectively separated from each other can be increased by an offset (predetermined distance B) in the width direction between the first and second sensor groups 25, 27. This can further reduce the likelihood that the seat occupancy sensor 20 may erroneously determine that someone is sitting on the seat section 11C, for example, when a person sitting on the seat section 11R or 11L rests his or her hand on the adjacent seat section 11C. In other words, it is possible to further reduce the likelihood that the seat occupancy sensor 20 may erroneously determine that someone is sitting on the seat section 11C, regardless of how a person rests (puts) his or her hand on the seat section 11C.

(7) In this embodiment, it is possible to set the detection sensitivity of the first sensor cells 26F, 26C, 26R to be lower than the detection sensitivity of the second sensor cells 28F, 28C, 28R by using a very simple structure based on the size relationship between the electrode areas.

The above embodiment may be changed as follows. In the above embodiment, the first detection strip 21 (first sensor group 25) may extend on the centerline L in the front-rear direction.

In the above embodiment, the number of the first sensor cells in the first sensor group 25 may be any plural number. Similarly, the number of the second sensor cells in the second sensor group 27 may be any plural number. For example, the number of the first sensor cells and the number of the second sensor cells may be different from each other.

In the above embodiment, the seat occupancy sensor 20 may be provided in at least one of the seat sections 11R, 11L, instead of the seat section 11C or in addition to the seat section 11C. Alternatively, the seat occupancy sensor 20 may be provided in a driver's seat or a front passenger seat.

In the above embodiment, the predetermined distances AF, AC, AR may be the same or different from one another. In the above embodiment, the number of the detection units 24 between one of the first sensor cells 26F, 26C, 26R and one of the second sensor cells 28F, 28C, 28R that become conductive at the same time when the seat occupancy sensor 20 determines that someone is sitting on the seat section 11C may be any number, provided that these two sensor cells are separated from each other by the fixed distance A or longer. In particular, when changing the number of the first sensor cells or the number of the second sensor cells, it is preferable to change the number of the detection units 24 located between two sensor cells according to the change.

In the above embodiment, it is not absolutely necessary that one of the first sensor cells 26F, 26C, 26R and one of the second sensor cells 28F, 28C, 28R that become conductive at the same time when the seat occupancy sensor 20 determines that someone is sitting on the seat section 11C are separated from each other by the fixed distance A or longer.

In the above embodiment, for example, the thickness of the insulating spacer in the first detection strip 21 may be set to be larger than the thickness of the insulating spacer in the second detection strip 22 so that the detection sensitivity of the first sensor cells 26F, 26C, 26R is set to be lower than the detection sensitivity of the second sensor cells 28F, 28C, 28R.

In the above embodiment, the detection sensitivity of the first sensor cells 26F, 26C, 26R and the detection sensitivity of the second sensor cells 28F, 28C, 28R may be equivalent to each other. In the above embodiment, the seat occupancy sensor 20 may determine that someone is sitting on the seat section 11C when both of at least one of the plurality of first sensor cells 26F, 26C, 26R and at least one of the plurality of second sensor cells 28F, 28C, 28R become conductive.

It is not absolutely necessary that the front-rear direction of the seat section 11C (seat) coincides with the front-rear direction of the vehicle.

What is claimed is:

1. A seat occupancy sensor comprising:
   a first sensor group having three first sensors that are arrayed in a front-rear direction of a seat of a vehicle and that become conductive as a load is applied thereto;
   a second sensor group having three second sensors that are arrayed in the front-rear direction, farther on a front side of the seat and closer to an end of the seat in a width direction than the first sensor group, and that become conductive as the load is applied thereto; and
   an electronic control unit configured to determine that someone is sitting on the seat when:
   (i) one of the first sensors becomes conductive,
   (ii) one of the second sensors becomes conductive, and
   (iii) two sensors, of the first and second sensors, exist between the one of the first sensors that has become conductive and the one of the second sensors that has become conductive.

2. The seat occupancy sensor according to claim 1, wherein a detection sensitivity of the first sensors is lower than a detection sensitivity of the second sensors.

3. The seat occupancy sensor according to claim 2, wherein the first sensors have an electrode area smaller than an electrode area of the second sensors so as to have the detection sensitivity lower than the detection sensitivity of the second sensors.

4. The seat occupancy sensor according to claim 1, wherein the seat is a center seat section that is disposed at a center of a plurality of seat sections provided side by side in a width direction of the vehicle in a rear seat that is disposed on a rear side of the vehicle.

5. A seat occupancy sensor comprising:
   a first sensor group having a plurality of first sensors that are arrayed in a front-rear direction of a seat of a vehicle and that become conductive as a load is applied thereto;
   a second sensor group having a plurality of second sensors that are arrayed in the front-rear direction, farther on a front side of the seat and closer to an end of the seat in a width direction than the first sensor group, and that become conductive as the load is applied thereto; and
   an electronic control unit configured to determine that someone is sitting on the seat when both of at least one of the first sensors and at least one of the second sensors become conductive,
   wherein each of the first sensors is connected in series to a different one of the second sensors.

6. The seat occupancy sensor according to claim 5, wherein a detection sensitivity of the first sensors is lower than a detection sensitivity of the second sensors.

7. The seat occupancy sensor according to claim 6, wherein the first sensors have an electrode area smaller than an electrode area of the second sensors so as to have the detection sensitivity lower than the detection sensitivity of the second sensors.

8. The seat occupancy sensor according to claim 5, wherein the electronic control unit is configured to determine that someone is sitting on the seat when both of one of the first detection units and one of the second detection units, that is separated from the one of the first detection units by a predetermined distance, become conductive.

9. The seat occupancy sensor according to claim 5, wherein the seat is a center seat section that is disposed at a center of a plurality of seat sections provided side by side in a width direction of the vehicle in a rear seat that is disposed on a rear side of the vehicle.

10. A seat occupancy sensor comprising:
    a first sensor group having at least three first sensors that are arrayed in a front-rear direction of a seat of a vehicle and that become conductive as a load is applied thereto;
    a second sensor group having at least three second sensors that are arrayed in the front-rear direction, farther on a front side of the seat and closer to an end of the seat in a width direction than the first sensor group, and that become conductive as the load is applied thereto; and
    an electronic control unit configured to determine that someone is sitting on the seat when:
    (i) one of the first sensors becomes conductive,
    (ii) one of the second sensors becomes conductive, and
    (iii) a quantity of sensors, of the first and second sensors, exist between the one of the first sensors that has become conductive and the one of the second sensors that has become conductive, the quantity of sensors being one less than both a quantity of the first sensors in the first group and a quantity of the second sensors in the second sensor group.

11. The seat occupancy sensor according to claim 10, wherein a detection sensitivity of the first sensors is lower than a detection sensitivity of the second sensors.

12. The seat occupancy sensor according to claim 11, wherein the first sensors have an electrode area smaller than an electrode area of the second sensors so as to have the detection sensitivity lower than the detection sensitivity of the second sensors.

13. The seat occupancy sensor according to claim 10, wherein the seat is a center seat section that is disposed at a center of a plurality of seat sections provided side by side in a width direction of the vehicle in a rear seat that is disposed on a rear side of the vehicle.

* * * * *